April 21, 1959     S. M. KASS     2,882,811

COFFEE MUSHROOM

Filed Jan. 9, 1957

INVENTOR
Samuel M. Kass
BY
ATTORNEYS

2,882,811
COFFEE MUSHROOM

Samuel M. Kass, Philadelphia, Pa.

Application January 9, 1957, Serial No. 633,205

1 Claim. (Cl. 99—312)

The present invention relates to coffee percolators and coffee mushrooms therefor.

A purpose of the invention is to permit making of stronger coffee in a percolator.

A further purpose is to make coffee more quickly in a percolator.

A further purpose is to save coffee.

A further purpose is to obtain more complete extraction of coffee from coffee grounds in a percolator so that strong coffee can be obtained even when the grounds are reused more than once.

A further purpose is to feed the return water more uniformly over the coffee ground bed in making coffee.

Further purposes appear in the specification and in the claim.

In the drawings I have chosen to illustrate one only of the numerous embodiments in which my invention may appear, selecting the form shown from the standpoints of convenience in illustration, satisfactory operation and clear demonstration of the principles involved.

Figure 1:
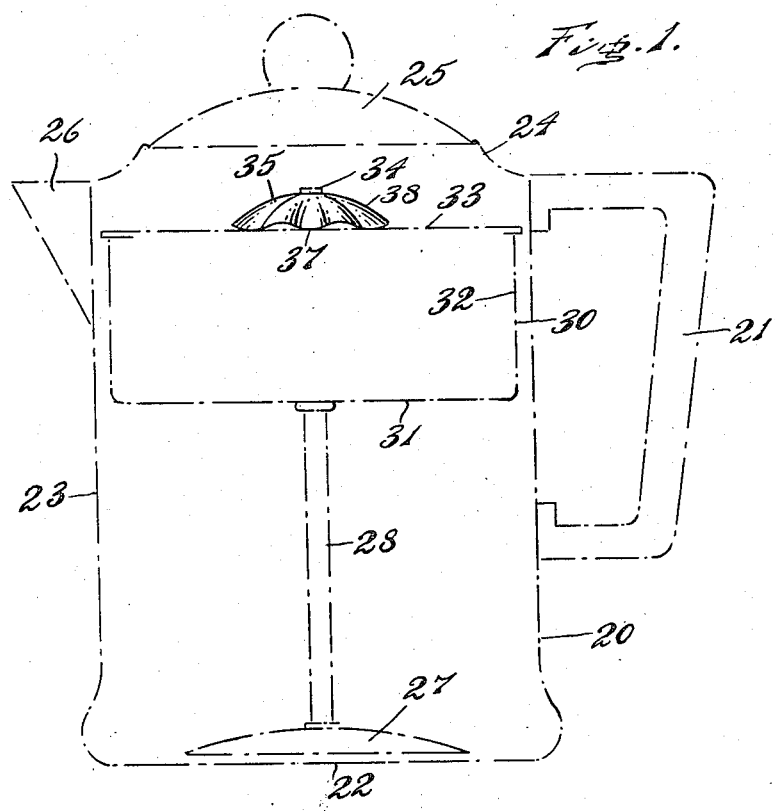
Figure 1 is a side elevation partly in phantom showing a coffee percolator and coffee mushroom of the invention in place therein.
Figure 2:
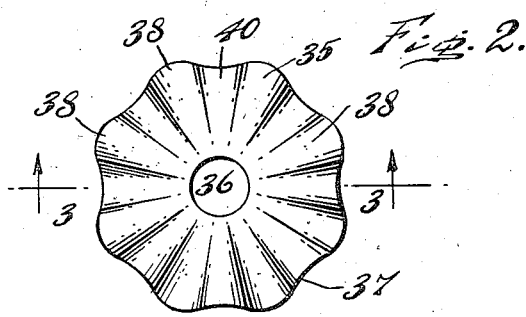
Figure 2 is a top plan view of the coffee mushroom of the invention.
Figure 3:
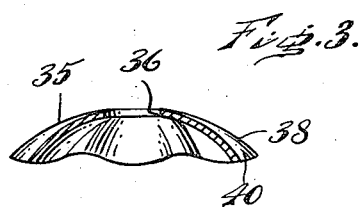
Figure 3 is a section of Figure 2 on the line 3—3.

Describing in illustration but not in limitation and referring to the drawing:

When coffee is made in a percolator, difficulty is frequently encountered in obtaining sufficiently strong coffee to satisfy many tastes. The operation is also likely to be slow if strong coffee is desired.

The normal operation of the percolator is rather inefficient, and a particular coffee bed in a percolator will often require replacement before it has truly lost its capability of producing good coffee.

I have discovered by experimentation that the difficulty previously encountered is in large part due to channeling and short circuiting of the flow of liquid down through the coffee bed. In a usual percolator, very hot liquid from the bottom of pot is projected upwardly through the upcomer, and strikes the lid of the pot and is downwardly deflected. In some cases the liquid drops downward without ever reaching the lid. Unless precautions are taken, a great deal of the downwardly deflected liquid flows down in the portion of the coffee bed closely around the upcomer. This tends to exhaust the coffee grounds in that area and even displaces them to form channels. On the other hand, coffee grounds near the outside are not equally exposed to liquid, and so the user is likely to become convinced that the coffee grounds are exhausted and throw them away, when in fact they still are capable of producing fine coffee.

All of the above difficulties are complicated by the fact that channeling and short circuiting greatly prolong the coffee making operation so that the user often is not satisfied with the strength of the coffee even after extended brewing.

In accordance with the invention, the return liquid from the upcomer is carried relatively far out over the coffee bed by a mushroom and then allowed to flow down. Since the liquid is more widely distributed, and enters the bed at a position where the bed is much larger in circumference, there is much less tendency to channel and short circuit. Accordingly, the utilization of the coffee grounds is considerably equalized and coffee is saved. Since the mushroom does not fit tightly but only loosely around the top of the upcomer, there is of course a considerable amount of liquid which flows down adjacent the outside of the upcomer so that the coffee grounds in this location are used also.

Considering now the drawings in detail, I show a coffee percolating pot 20 having a handle 21, a bottom 22, side walls 23, a top 24 receiving a lid 25 and a pouring spout 26. A steam dome 27 of well known character rests on the bottom 22 and is connected to an upcomer or upflow pipe 28 which mounts a surrounding coffee receptacle 30 having a perforated bottom wall 31, perforated side walls 32 and a removable perforated top wall 33.

The space inside the coffee container receives coffee grounds from which the coffee is made.

The upcomer 28 terminates at 34 at the center above the top of the coffee container.

I place a suitably metallic mushroom 35 around the top of the upcomer. The mushroom is desirably made of aluminum or stainless steel. The mushroom has a central opening 36 which closely surrounds the upcomer but does not tightly engage the upcomer so that leakage of liquid occurs downward between the upcomer and the mushroom, although the bulk of the liquid discharged upwardly by the upcomer flows over the top of the mushroom.

The mushroom is dished or outwardly and downwardly sloped and terminates in a generally circular outer periphery 37 which is desirably located slightly over one-third of the distance from the center to the side wall of the pot.

The dished wall of the mushroom is desirably fluted or recessed, providing radial ribs 38 and radial channels 40. This has a tendency to guide the outward flow in widely divergent paths even if the mushroom does not sit entirely level.

In operation, the pot is partially filled with water and the coffee container is filled with coffee grounds, as well known, and the steam-dome-upcomer-coffee-container are inserted in the pot, as well known. The mushroom is fitted on the top of the upcomer and rests on the upper perforated wall of the coffee container. The lid is then closed and the pot placed on the stove.

When the water becomes hot and boils, there is an upward flow through the upcomer which in some cases strikes the inside of the lid and in other cases simply falls. In any case, the bulk of the water is guided by the mushroom to a position relatively far out from the upcomer and then flows down through the coffee grounds. A certain amount of the water, however, flows downward adjacent the outside of the upcomer.

It will of course be evident that any ratio of distribution can be obtained by placing a few small perforations (not shown) distributed over the mushroom. It is decidedly preferable usually, however, to use an unperforated mushroom, as better distribution is thus obtained.

I find that the use of the mushroom as above indicated produces a great improvement in the quality of the coffee, in the efficient utilization of coffee grounds and the speed in which good and relatively strong coffee can be made.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claim.

Having thus described my invention, what I claim as new and desire to secure by Letters Patent is:

A percolator for making coffee, said percolator including outside and inside receptacles, the outside receptacle having a bottom, a side wall and a cover lid, and said inside receptacle having a perforated wall and a removable perforated top cover and being adapted to contain a charge of coffee, a steam dome standing on the inside surface of the bottom of said outside receptacle, an upflow pipe extending from said dome upward through said inside receptacle and having a discharge end beneath said removable cover lid of the outside receptacle and above said perforated top cover for the inside receptacle, said steam dome, upflow pipe and inside receptacle and perforated top cover being a unit removable from said outside receptacle, and a mushroom having a central aperture accommodating said upflow pipe removably and a generally circular outer periphery supported on said perforated top cover, and said mushroom having a top surface sloping downwardly and outwardly from said central aperture to said outer periphery, the top surface of said mushroom forming uniformly spaced generally radial channels outward from said central aperture and extending downward to said outer periphery, thus for said mushroom to distribute liquid by gravity to outwardly located perforations in said perforated top cover of the inner receptacle.

References Cited in the file of this patent

UNITED STATES PATENTS

| | | |
|---|---|---|
| 1,036,767 | Wojidkow | Aug. 27, 1912 |
| 1,160,684 | Ball | Nov. 16, 1915 |
| 1,183,721 | Bowman | May 16, 1916 |